March 30, 1965 W. SMITH ETAL 3,175,459
METER FOR OPTICALLY MEASURING FLUID CURRENT VELOCITY
Filed Oct. 1, 1962 3 Sheets-Sheet 1

INVENTORS
WINCHELL SMITH
GLEN F. BAILEY

BY
ATTORNEYS

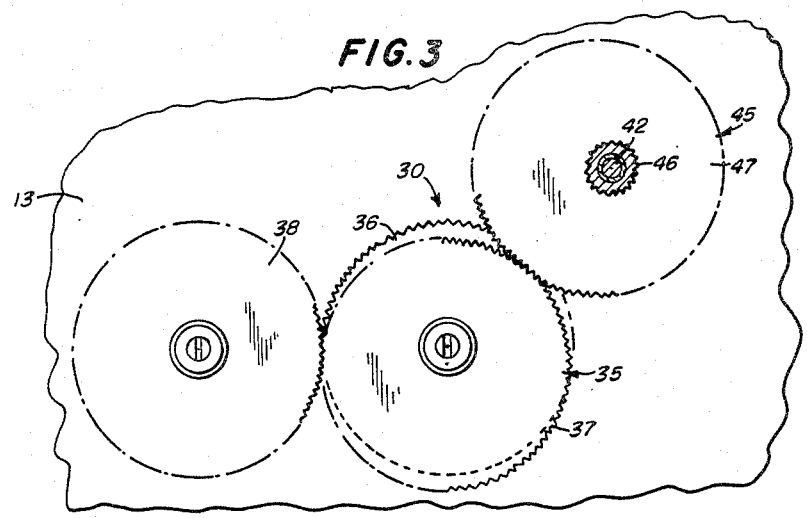
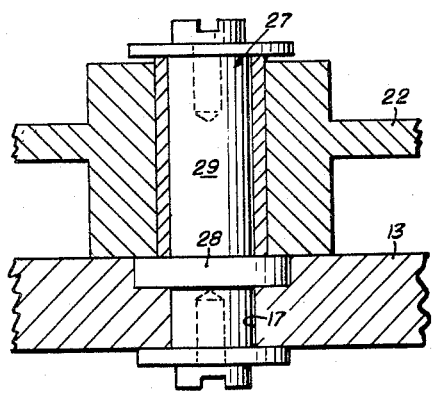
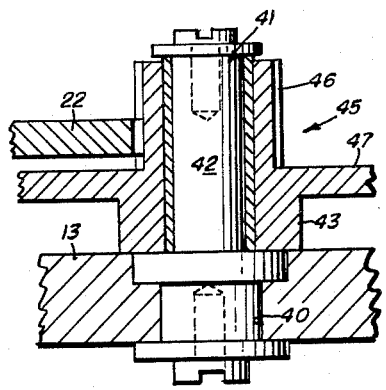
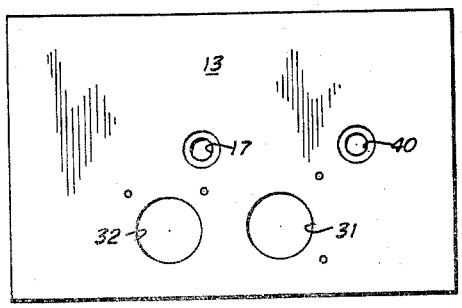

United States Patent Office

3,175,459
Patented Mar. 30, 1965

3,175,459
METER FOR OPTICALLY MEASURING FLUID
CURRENT VELOCITY
Winchell Smith, Hayward, and Glen F. Bailey, Albany,
Calif., assignors to the United States of America as
represented by the Secretary of the Interior
Filed Oct. 1, 1962, Ser. No. 227,615
6 Claims. (Cl. 88—14)
(Granted under Title 35, U.S. Code (1952), sec. 266)

The invention herein described and claimed may be manufactured and used by or for the Government of the United States of America for governmental purposes without the payment of royalties thereon or therefor.

This invention relates to a meter for gauging the velocity of the flow or current in a stream or channel of a river. By means of this meter an instantaneous measure of the surface velocity of the flow or current may be obtained by direct observation of the water surface from a point above the stream or river. More particularly, the invention concerns improvements in a current velocity measuring instrument comprising a stroboscopically operated mechanism.

Previous apparatus used for measuring the velocity of currents in open channels usually constituted a meter having a rotatable bucket wheel generally in the structural form of that disclosed by Price in Patent No. 1,571,433, issued February 2, 1926. This meter would perforce be immersed in the stream, at the end of a suspension rod or sounding line. Equipment of this type is not well suited to very high velocity regimes such as where the velocities are greater than 20 feet per second. Immersion of equipment in a high speed stream is physically very difficult, and the accuracy of the measurements obtained under these circumstances, is questionable. For example, in fast shallow water, use of the bucket or cup-type meter is impractical because of calibration problems caused mainly by aeration and also because of the physical problem of holding the meter in position in the water. Other methods and equipment have also been employed where high stream velocities are encountered, and include the use of Pitot tubes inserted in a stream moving in closed conduits, timing the rate of transfer of a slug of salt solution or other material injected under pressure, computation of dilution of a chemical injected at a known rate, or measurement of energy dissipated when flow rate is decreased to zero. However, for most of these means and methods, the instrumentation becomes involved and much too complicated for routine field use. Moreover, difficulties arise in each case from the need for placing the equipment in the stream. According to the present invention, a high velocity measuring apparatus is provided requiring no physical contact with any of the flow in the channel. Consequently, this apparatus will permit accurate measurements of flood flows under conditions previously considered impossible.

It is therefore an object of the present invention to provide a portable current meter of simplified and compact construction, which may be used for obtaining high velocity measurements of a stream by merely observing the stream at a position remote from the flow of the stream.

Another object of the invention is to provide a current meter having optical elements made operable according to stroboscopic principles to present an apparently stationary view of a flowing current.

A further object of the invention is to provide an optical current meter permitting highly accurate velocity measurements of a current flow observable in the meter on rotatable optical elements therein, and which is equipped with a compensating means in a variable speed drive for these optical elements, to perfect an illusion in the view observed.

These and other objects and advantages of the invention will be more clearly understood from the following description of a preferred embodiment of the invention, considered together with the accompanying drawings wherein:

FIG. 3 is a fragmentary view showing an assembly of gears in the optical current meter;

FIGS. 4 to 6 are further fragmentary views showing the bearing elements for the rotating parts of the meter, and a portion of the meter housing in which these elements are supported.

Figure 1:
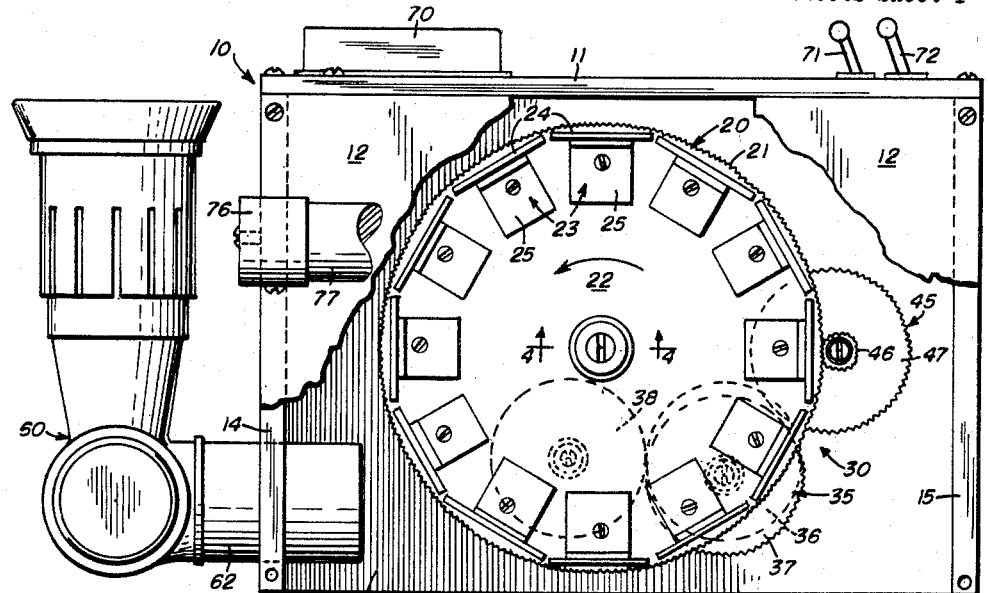
FIG. 1 is an elevational view of the optical current meter, shown partly in section to reveal the arrangement of its optical elements.
Figure 2:
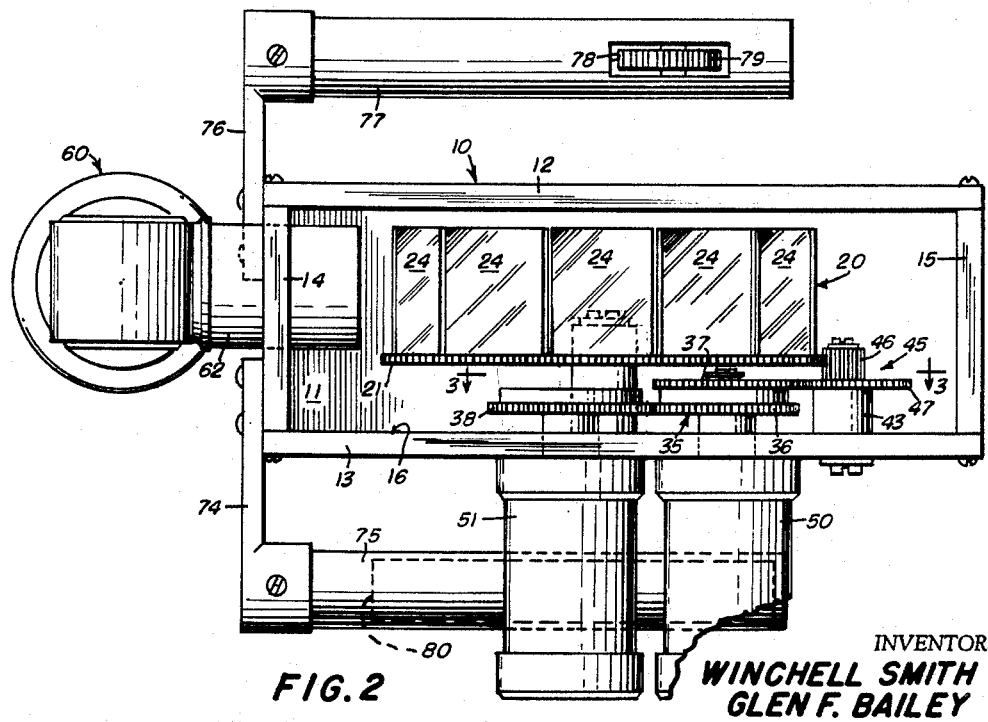
FIG. 2 is a view of the meter shown in FIG. 1, as seen from below.

Referring particularly to FIGS. 1 and 2, a preferred embodiment of the improved current meter may be seen as comprising a main housing 10, on which are mounted the various optical, mechanical and electrical components of the meter. This housing is made up of a number of rectangular plates which may be of aluminum or some other rugged sheet material, and includes a top plate 11 to which are joined by machine screws or the like, two side plates 12 and 13, the latter having further joined thereto by machine screws, two end plates 14 and 15. Assembled in this manner the five plates form a box-like enclosure, the bottom edges of which define a rectangular opening 16, the purpose for which will hereinafter become more fully evident. To an inner surface of the side plate 13, are attached the principal rotatable elements of the meter, including a mirror drum 20, and a gear assembly 30, which may be made operable to drive the mirror drum. Fastened to the outer surface of plate 13, are a drive motor 50, and a tachometer generator 51, having driving and driven shafts respectively, extending from their casings and through the plate into operative connections with the gears in the assembly 30. Through an appropriately sized circular opening near the lower edge of plate 14, is inserted a cylindrical sleeve 62 cooperatively relating to a telescope arrangement 60 to the structure within housing 10. Fixed within openings arranged for convenience on the top plate 11, are a tachometer microammeter 70, and a pair of toggle switches 71 and 72, separately operable to energize the electrical circuits provided for operating the drive motor 50, and the tachometer generator 51 respectively.

Mirror drum 20, shown in detail in FIGS. 1 and 2, comprises a circular spur gear 21, and a plurality of mirror assemblies 23, attached thereto. Circumferentially spaced around on a side face 22 of the gear 21, the mirror units 23, are arranged within a circle concentric with and close to the circumferential edge of the gear. Each mirror unit 23, comprises a substantially square flat mirror 24, having its reflective surface directed outward so as to define a chord in its enclosing circle. A right angle bracket 25 in each unit provides on one leg a surface to which mirror 24 is cemented, and on its other leg holes for screws to attach the unit to the gear face 22. The preferred embodiment is provided with twelve mirror units, although more or less of them may be used in designing a particular current meter, depending principally on the anticipated range of current velocities to be measured by the meter. To accommodate mounting the mirror drum 20 for rotation relative to the housing 10, there is provided a connector shaft structure 27 shown in FIG. 4 as having one end fixed in a countersunk hole 17, centrally located on the plate 13. A flange 28 on the connector is fitted within the countersunk hole and fastened to plate 13 by a washer contacting the outer surface of the plate and retained thereon by a screw secured in the supported end of the connector. A shaft 29 extending from the flange 28 supports a bearing sleeve over which is slip fitted the hub of the spur gear 21, which are held in place on the connector structure by screw and washer elements on the extended opposite end of the shaft.

Filling relatively wide circular openings 31 and 32 near the lower edge of the plate 13 as best shown in FIG. 6, are correspondingly shaped circular flanges on the shaft ends of the drive motor 50, and tachometer generator 51, respectively. Bracket elements formed integral with the casings of motor 50, and generator 51, facilitate their attachment to the outer surface of housing plate 13, whereby these casings are maintained fixed in place against the driving forces acting thereon. On the drive motor shaft extending through plate 13, is fixed a relatively wide gear element 35 having a circumferential recess by means of which are defined two distinct but integrally related equal diameter circular drive gears 36 and 37. Moreover, as best shown in FIG. 3, the center point of gear 37 is slightly displaced relative to that of gear 36, the latter being concentric with the axis of rotation of gear element 35. Eccentric rotation of the gear 37 is achieved in this manner for a purpose to be hereinafter explained. From the tachometer generator 51, there is also extended within the housing 10, a rotatable shaft which has fastened thereto a driven gear element 38. A circumferential band of element 38 is provided with gear teeth matching those on the drive motor gears, and positioned by its location relative to plate 13, to operatively engage the drive gear 36.

As shown in FIGS. 5 and 6, another countersunk hole 40 in the plate 13, in horizontal alignment with the centered hole 17, provides means to appropriately locate and secure another connector shaft structure 41. On that shaft portion 42 of this connector, is supported a conventional bearing sleeve over which is slip fitted the hub 43 of a compensating gear component 45. A screw and washer engaging the unsupported end of the shaft 42, suitably maintains on this shaft the component 45 in its operative position among the other driving and driven gears in the gearing assembly 30.

Gear component 45 intgerally combines a pinion gear 46, and a spur gear 47. But whereas the pitch circle of pinion gear 46 is concentric with the hub and its axis of rotation, the center of the pitch circle defining gear 47, is slightly displaced from such axis of rotation, whereby gear 47 is rotatable eccentric thereto. As already indicated, connector 41 is nevertheless effective to locate by its support of gear component 45, the pinion gear 46 to mesh with mirror drum gear 21, and the spur gear 47 to mesh with motor driven gear 37, for uninterrupted rotational engagement of these gears. However, because of the eccentricity of gears 37 and 47 relative to their axis of rotation, there will be present at their points of driving engagement, continuous and gradual variations in peripherial speed. For example, when the shortest radius of rotation on gear 37 is in line with the longest rotating radius on gear 47, the effective peripheral speed at their contacting points will be at its lowest value, whereby pinion gear 46 is given its minimum angular velocity, and at the other extreme, the highest peripheral speed will occur when the radius in line to the points of contact on gear 37 is its longest, whereby the angular velocity given gear 46 is at a maximum since the radius of gear 47 then aligned to the point of contact is its shortest. As a result, the rotational speed of gear component 45 varies cyclically each revolution of the drive motor gears, and by cooperating thusly, gear means 35 and 45 are effective to modulate the driving action from the motor to the mirror drum, in accordance with a particular fuctional relationship to be hereinafter described.

To the outside surface of end plate 14 of the main housing, are attached a pair of brackets 74 and 76, to which are fastened tube-like hand grips 75 and 77, respectively. These hand grips are fitted into socket portions at the extended ends of the brackets, and secured therein by screws in a conventional manner. Contained within hand grip 75 is a power source 80 which may be in the form of a battery in contact with electrical terminals for connecting it in a circuit with the drive motor 50. Near the unsupported end of hand grip 77 is a short slot 78 in which is mounted for rotation a thumb wheel 79. Within this hand grip is also found a motor speed regulating rheostat electrically connected into the aforesaid drive motor circuit. In an obvious manner, the control shaft of the rheostat is geared to the shaft supporting the thumb wheel 79, whereby the speed of the drive motor may be conveniently regulated in relatively minute steps, by the thumb of a hand gripping the tubular element 77.

Figure 7:
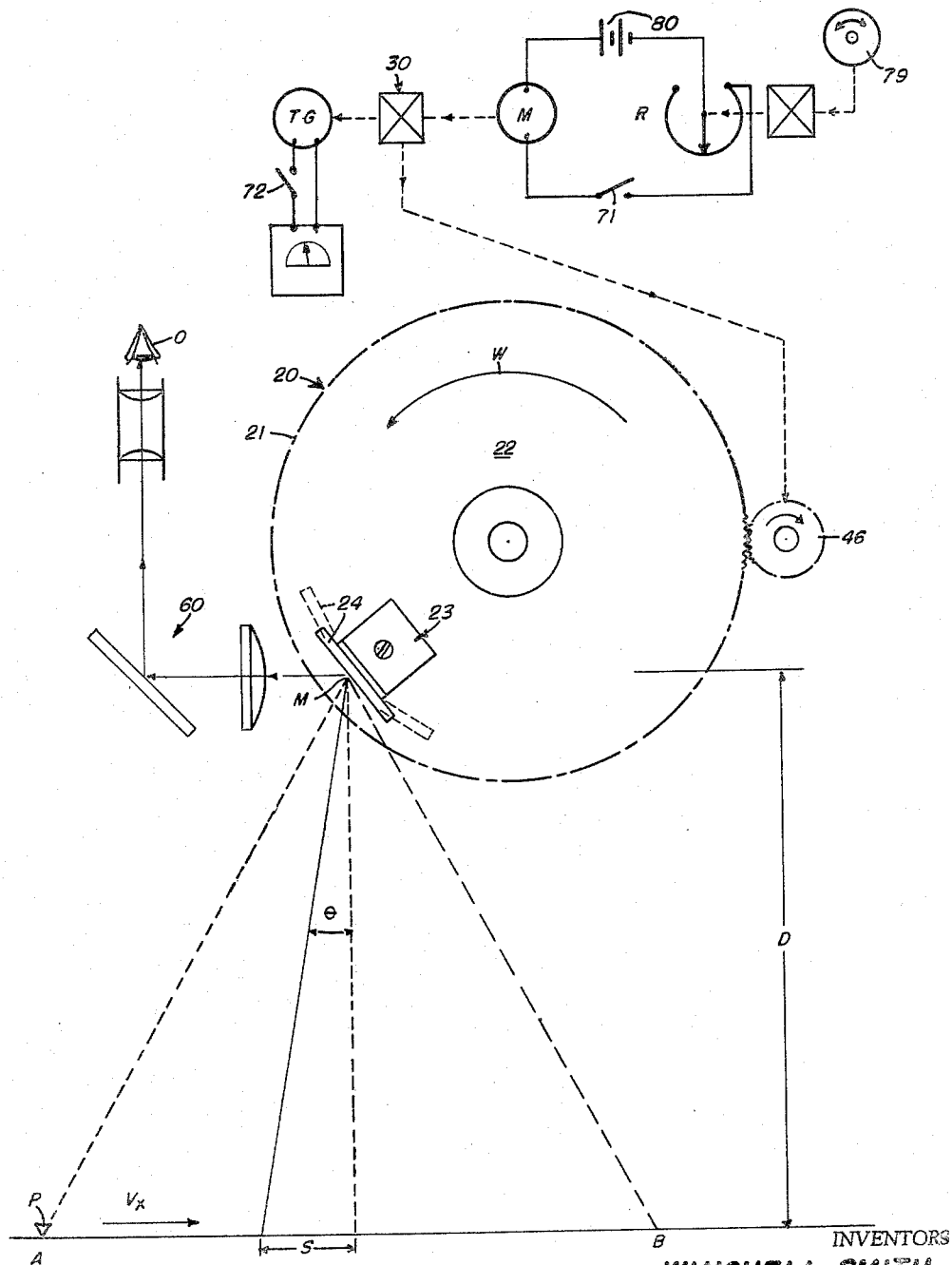
FIG. 7 is a schematic illustration of various parts in the meter in connection with their use in measuring the velocity of a current flow.

Applying the improved current meter to measure the velocity of the current in a channel, requires that the meter be held or supported at a predetermined distance over the water surface, with the opening 16 in its housing 10, fully facing this surface. When so located in operative position, visual observation of the current flow may be made by sighting through the telescope arrangement 60. As illustrated by the schematic of FIG. 7, the operator-observer O, sights through the magnifying lenses, right angle prism, and objective lens of the telescope 60, to observe on the reflective face of mirror 24, a view of particles, or other distinguishable marks such as P, moving with the current flow on the surface of the water. After energizing the meter by switching toggles 71 and 72 to on, the operator commences to regulate the speed of motor 50 by turning rotating thumb wheel 79, which drives a contact arm across the rheostat R in the motor circuit. Motor driven gear 36 of gear element 35, operatively engaged with the tachometer generator drive gear 38, rotates the armature of generator 51, accordingly, and motor driven gear 37 on the element 35, rotates the eccentrically mounted gear 47, engaged therewith. Pinion 46 integrally formed with the gear 47, rotatably engages the spur gear 21 of the mirror drum 20, and moves the drum at the angular speed determined by the gear train described. As explained previously, this speed is repeatedly modulated in a cyclic manner by means of the coaction between gearing means 35 and 45. However, microammeter 70 in the output circuit of the tachometer generator, is nevertheless operative to indicate on its appropriately calibrated scale, the average angular velocity of the mirror drum.

The need for angular speed modulation in the stroboscopical arrangement of the present invention, arises from the fact that the small area of the water surface around particle P thereon, that may be seen within the frame of a single mirror 24, actually travels along the surface on the chord of the vertical angle through which it is followed. This vertical angle PMB (referred to hereinafter as the viewing angle), may range for example, from +30° to −30°. Consequently, if the mirror drum were rotated at constant speed, close speed synchronization between the movement of the mirror drum and a point on the water surface being observed, could be obtained only within a small central portion of the viewing angle. This asynchronization of the image at the extremes of the viewing angle would lead to variation of readings made by different observers measuring the same current flow. Correction of this difficulty is achieved by the use of the gears of the compensating elements 35 and 45, to act as function gears. Derivation of the relationship on which the correction function is based, is as follows:

Referring to FIG. 7, the image of the moving water surface is shown reflected into the objective of the telescope by the revolving mirror. A given particle will remain stationary in the field of view as it moves from A to B if the angular speed of the mirror W is synchronized in proportion to the velocity of the water $V_x$. Therefore the relation follows that (1) $$S = D \tan \theta$$

where

S is horizontal distance on water surface.
D is vertical distance from mirror to water surface.

More rigorously, D is the length of the normal from the water surface to the optical axis of the telescope objective. For channels with a steep slope the meter must be set perpendicular to the water slope so that compensation of mirror angular velocity, discussed below, will be in phase.

(2) $$V_x = \frac{ds}{dt} = \frac{d(D \tan \theta)}{dt}$$

where $V_x$ is surface velocity.
$\theta$ is an instantaneous angle of view, measured from the vertical.

Or $$V_x = D \sec^2 \theta \frac{d\theta}{dt}$$

However, $$\frac{d\theta}{dt}$$

is equal to the sum of the rate of change of the angles of incidence and reflection from the mirror, and because these two are each equal to W, the instantaneous angular speed of the mirror, $d\theta/dt = 2W$.

(3) $$\therefore V_x = D \sec^2 \theta (2W)$$

where W is the instantaneous mirror speed in radians/second

Because $V_x$ is constant, (4) $$W = \frac{V_x}{2D \sec^2 \theta} = \frac{V_x \cos^2 \theta}{2D}$$

The average angular speed of the mirrors, $\overline{W}$, is the value registered by the tachometer.

(5) $$\overline{W} = \frac{\int_{\theta_1}^{\theta_2} W d\theta}{\theta_2 - \theta_1} = \frac{V_x \int_{\theta_1}^{\theta_2} \cos^2 \theta d\theta}{2D(\theta_2 - \theta_1)} = \frac{V_x \left[ \frac{1}{4} \sin 2\theta + \frac{1}{2}\theta \right]_{\theta_1}^{\theta'_2}}{2D(\theta_2 - \theta_1)}$$

If a 12 mirror drum is used $\theta$ ranges from $-30°$ to $+30°$ and the Equation 5 reduces to:

(6) $$\overline{W} = \frac{V_x}{2D}(0.914)$$

and (7) $$V_x = \frac{2D\overline{W}}{0.914}$$

Or, if W is expressed in revolutions per second, $$V_x = 4\pi \overline{W} D (1.094)$$

The modulation required for a 12 mirror drum expressed as the ratio of instantaneous mirror speed to average mirror speed is therefore:

(8) $$\frac{W}{\overline{W}} = \frac{\frac{V_s \cos^2 \theta}{2D}}{\frac{V_x(0.914)}{2D}} = 1.094 \cos^2 \theta$$

Equation 4 of the preceding derivation demonstrates that the required angular speed of the mirror is established by the velocity of the water and the distance of the meter above the water, and that it must also be modulated during each viewing cycle in proportion to the square of the cosine of the instantaneous angle of view. Magnitude of the modulation for a 12 mirror system ranges from a $W/\overline{W}$ ratio of 0.822 to one of 1.094 according to Equation 8 above.

Use of a multiple mirror wheel is but one method of applying the basic optical principles involved. The same equations and analysis applies to a system using a single mirror oscillated by a cam. Another system could be devised using a rotating prism of an even number of faces placed in the optical path between an objective lens and an eyepiece. Mathematical analysis of this latter system is slightly different, but the basic principle is the same.

Improved synchronization may also be achieved by greatly increasing the number of mirrors on the mirror drum. However, by that means the scanning angle is reduced, and the time in passage for viewing upon each frame may be significantly reduced with an increase in the number of mirror faces. As a result, in a high velocity regime, there is insufficient time available for resolution of the image. Therefore the current meter of the present invention is uniquely improved by the use of compensating gearing. Since such gearing permits the use of a large scanning angle, and a longer viewing cycle, it eliminates the drawbacks of the limitations of the physiological response rate of the human eye, and it allows the production of a meter which will accurately measure over a much greater range of velocities and viewing conditions.

While a preferred embodiment of the invention has been described herein, it will be understood that the invention is not limited thereby, but is susceptible to changes in form and detail.

What is claimed is:

1. A meter for measuring the velocity of a current of fluid material comprising an enclosure structure having an opening at its bottom, means rotatably supported within said enclosure, a surface on said rotatable means having attached thereto a plurality of reflective surfaces arranged in a circular pattern, each said reflective surface being spaced at equal distances from the axis of rotation of said rotatable means, and facing away therefrom, a sighting means fixed in said enclosure, and in position to allow a view therethrough of reflective surfaces facing the said opening in the enclosure structure, a variable speed driving means and speed control means therefor, a speed responsive electrical generator and a speed indicator electrically connected to receive the output of said generator, an assembly of drive transmitting elements supported for rotation within said enclosure structure, and operably engaged with the speed controlled driving means to transmit a rotational drive to said generator and to said rotatable means, said drive transmitting elements comprising angular motion compensating elements connected between said driving means and a drive transmitting element engaging said rotatable means, whereby the angular velocity of said rotatable means is repeatedly varied in a cyclic manner.

2. The meter of claim 1, wherein the said rotatable means comprises a gear having attached to a side surface thereof, the said plurality of reflective surfaces.

3. The meter of claim 1, further comprising a D.-C. power source, and wherein the variable speed driving means is an electric motor in a circuit including said power source and said speed control means for said driving means.

4. A meter for measuring the velocity of a current of fluid material comprising an enclosure structure having an opening at its bottom, a gear means rotatably supported within said enclosure, a side surface of said gear means having attached thereto a plurality of mirrors arranged in a circular pattern to form a polygonal structure wherein each of said mirrors is equally spaced from the axis of rotation of said gear means and facing outwardly therefrom, a telescopic sighting means directed to allow a view therein of mirrors facing the said opening in the enclosure structure, a variable speed driving means, a speed responsive electrical generator, and a velocity indicator electrically connected to receive the output of said generator, an assembly of gears supported for rotation within said enclosure structure, and in operative engagement with the driving means to transmit a rotational drive to said generator and to said gear means, said assembly of gears comprising angular velocity compensating elements connected between said driving means and a gear engaging said gear means, whereby the angular velocity of said gear means is repeatedly varied in a cyclic manner.

5. A meter for measuring the velocity of a current of fluid material comprising a housing having an opening therein facing the fluid material, a plurality of substantially square, plane mirrors, fixedly supported on the side surface of a spur gear and arranged thereon to define a polyhedron-like structure wherein an extension of the rotational axis of said spur gear provides a central axis for said mirror structure, means mounting said spur gear for rotation within said housing whereby reflective surfaces of said mirror structure face the said opening in the housing, a sighting means supported in said housing and directed to allow a view therethrough of the reflective surfaces of mirrors facing said housing opening, a variable speed motor, and speed control means therefor, a speed responsive generator and a speed indicator responsive to the output thereof, a gear assembly supported in said housing and operatively engaged with said motor, said generator and said spur gear, said gear assembly comprising gears connecting said motor to drive the generator, and speed compensating means for transmitting the drive from said motor to said spur gear and operative thereby to cyclically vary the speed of said spur gear and the mirror structure fixed thereto.

6. A meter for measuring the velocity of a current of fluid material comprising within a housing, an optical apparatus including a viewing means and a rotatable light reflecting structure comprising a plurality of flat mirror surfaces arranged uniformly at equal radial distances about the axis of rotation of said rotatable light reflecting structure, their reflective surfaces facing away from said axis, said rotatable light reflecting structure being arranged to provide to said viewing means a stroboscopic sighting of the surface of the fluid in said current, an electric motor and means in a circuit therewith to vary the motor speed, a speed responsive electrical generator and a speed indicator in circuit therewith responsive to the output of said generator, a drive transmitting assembly comprising means connecting said motor to drive said generator, and speed compensating elements connecting the drive from said motor to said rotatable light reflecting structure and operable to cyclically vary in uniform periods of operation the angular velocity of said rotatable light reflecting structure, each of said periods of operation corresponding to the time required for the complete reflective surface of any one mirror to pass a sighting line through said viewing means, wherein said motor speed varying means is operable to change the time allotted for each said periods of operation.

References Cited by the Examiner
UNITED STATES PATENTS
2,686,453  8/54  Bogert _____ 88—14

FOREIGN PATENTS
327,274    7/35  Italy.
1,016,464  9/57  Germany.

JEWELL H. PEDERSEN, *Primary Examiner.*